United States Patent
Imai et al.

(10) Patent No.: US 10,353,315 B2
(45) Date of Patent: Jul. 16, 2019

(54) IMAGE FORMING APPARATUS THAT SEQUENTIALLY EXECUTES ADJUSTMENT OPERATIONS CORRESPONDING TO A PLURALITY OF ADJUSTMENT ITEMS

(71) Applicant: FUJI XEROX CO., LTD., Tokyo (JP)

(72) Inventors: Tomoya Imai, Kanagawa (JP); Nobuyuki Kuto, Kanagawa (JP); Takayuki Saito, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/643,820

(22) Filed: Jul. 7, 2017

(65) Prior Publication Data
US 2018/0253023 A1    Sep. 6, 2018

(30) Foreign Application Priority Data
Mar. 2, 2017 (JP) .................... 2017-039003

(51) Int. Cl.
*G06F 3/12* (2006.01)
*G03G 15/00* (2006.01)
*G03G 15/01* (2006.01)
*H04N 1/00* (2006.01)

(52) U.S. Cl.
CPC ..... *G03G 15/0131* (2013.01); *G03G 15/0194* (2013.01); *G03G 15/50* (2013.01); *G03G 15/502* (2013.01); *G03G 15/55* (2013.01); *G06F 3/1253* (2013.01); *H04N 1/00801* (2013.01)

(58) Field of Classification Search
CPC .......... G03G 15/0131; G03G 15/0194; G03G 15/50; G06F 3/1253; H04N 1/00801
USPC ........................................................ 399/38
See application file for complete search history.

(56) References Cited

U.S. PATENT DOCUMENTS

| 2003/0210413 | A1* | 11/2003 | Takeda | H04N 1/00002 358/1.9 |
| 2006/0013609 | A1* | 1/2006 | Martin | G03G 15/5016 399/81 |
| 2007/0177439 | A1* | 8/2007 | Saito | B41J 3/46 365/190 |

FOREIGN PATENT DOCUMENTS

| JP | 2009-134092 A | 6/2009 |
| JP | 2009134092 A | * 6/2009 |
| JP | 2014203001 A | * 10/2014 |

* cited by examiner

*Primary Examiner* — Susan S Lee
(74) *Attorney, Agent, or Firm* — Oliff PLC

(57) ABSTRACT

An image forming apparatus includes an image forming device that forms an image on a recording material. The apparatus further includes an adjuster that sequentially executes adjustment operations corresponding to plural adjustment items which are selected in advance. The apparatus further includes a display that displays information indicating that a setting in which an adjustment result is to be reflected is newly generated when the setting is newly generated during execution of the adjustment operations.

9 Claims, 14 Drawing Sheets

IMAGE FORMING APPARATUS THAT SEQUENTIALLY EXECUTES ADJUSTMENT OPERATIONS CORRESPONDING TO A PLURALITY OF ADJUSTMENT ITEMS

CROSS-REFERENCE TO RELATED APPLICATIONS

This application is based on and claims priority under 35 USC 119 from Japanese Patent Application No. 2017-039003 filed on Mar. 2, 2017.

BACKGROUND

Technical Field

The present invention relates to an image forming apparatus, an information processing apparatus, and a non-transitory computer readable medium.

SUMMARY

According to an aspect of the invention, an image forming apparatus includes:

an image forming unit that forms an image on a recording material;

an adjusting unit that sequentially executes adjustment operations corresponding to plural adjustment items which are selected in advance; and a display that displays information indicating that a setting in which an adjustment result is to be reflected is newly generated when the setting is newly generated during execution of the adjustment operations.

BRIEF DESCRIPTION OF THE DRAWINGS

Exemplary embodiments of the present invention will be described in detail based on the following figures, wherein.

DETAILED DESCRIPTION

Hereinafter, exemplary embodiments of the present invention will be described in detail with reference to the accompanying drawings.

First Exemplary Embodiment

Figure 1:
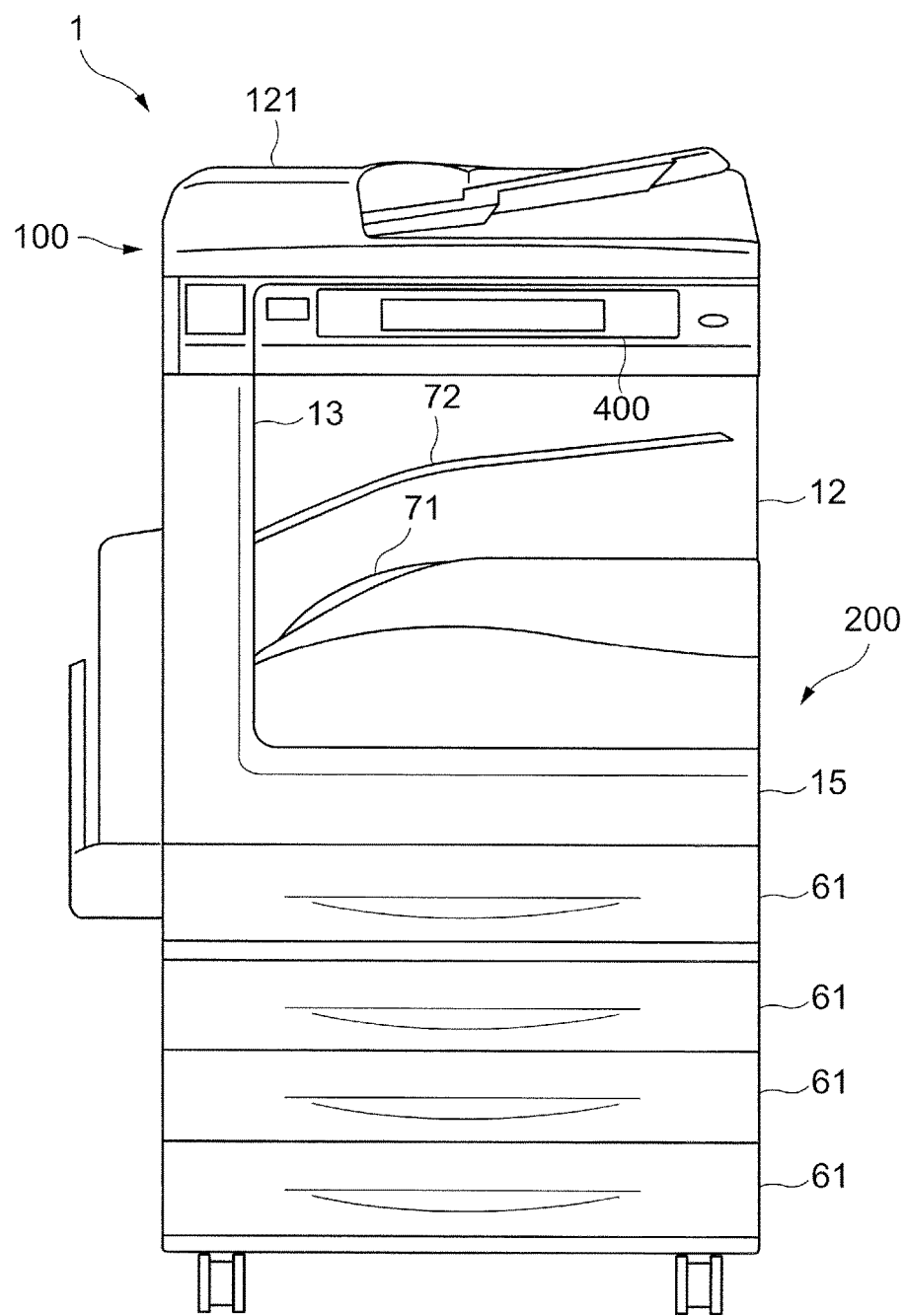
FIG. 1 is a view illustrating the external appearance of an image forming apparatus according to a first exemplary embodiment.
Figure 2:
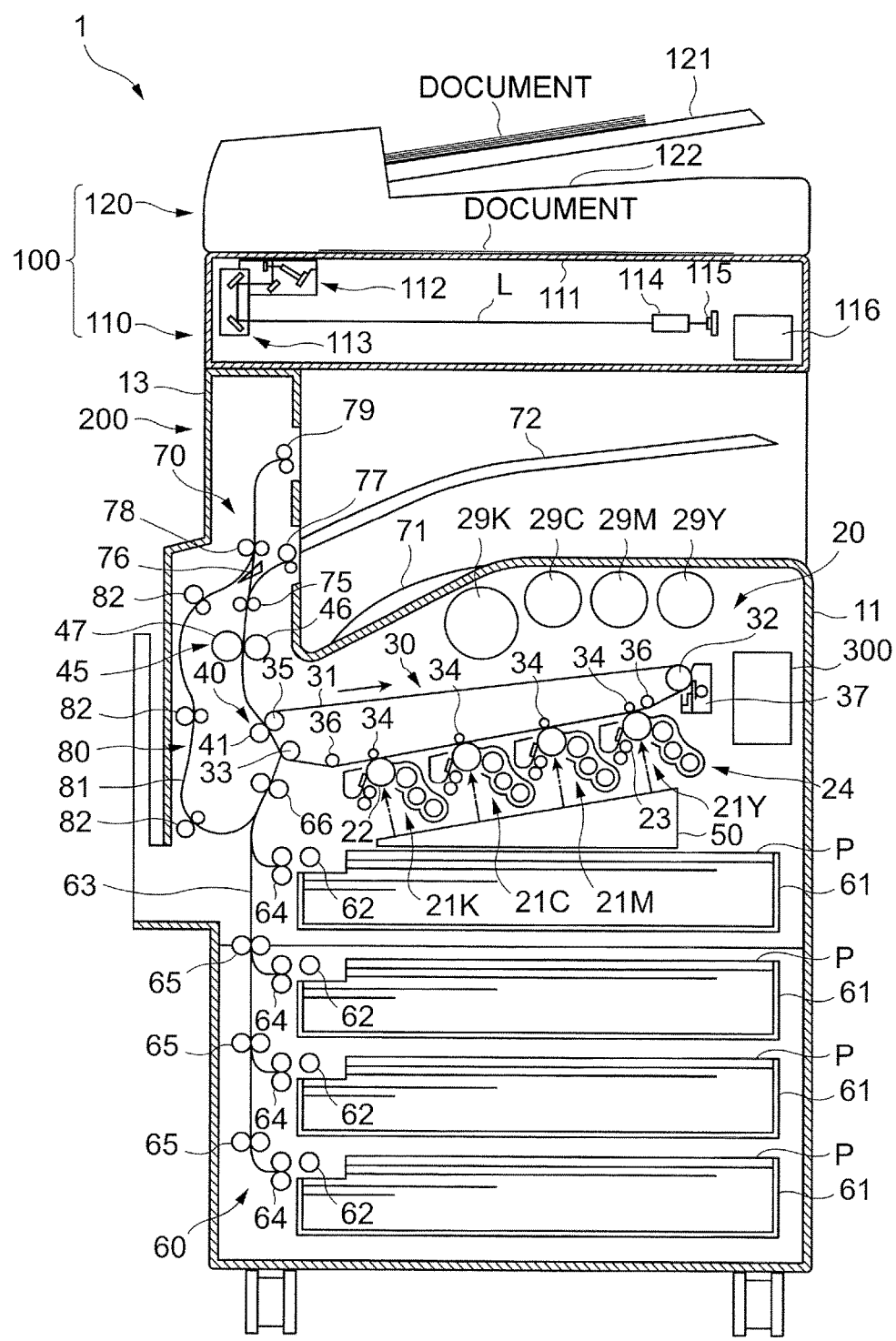
FIG. 2 is a view illustrating the internal structure of the image forming apparatus according to the first exemplary embodiment.

FIG. 1 is a view illustrating the external appearance of an image forming apparatus 1 according to a first exemplary embodiment. FIG. 2 is a view illustrating the internal structure of the image forming apparatus 1 according to the first exemplary embodiment.

The image forming apparatus 1 includes an image reading device 100 that reads an image of a document, and an image recording device 200 that records an image on a recording material (hereinafter, representatively referred to as a "sheet" in some cases).

The image forming apparatus 1 includes a control device 300 and a user interface (UI) 400. The control device 300 includes a microcomputer having a central processing unit (CPU), a read only memory (ROM), a random access memory (RAM), and the like, and controls the operation of the entire apparatus. The user interface 400 includes a touch panel, outputs instructions received from a user to the control device 300, and presents information from the control device 300 to the user.

The image reading device 100 is disposed in the top portion of the image forming apparatus 1, and the image recording device 200 is disposed below the image reading device 100 and incorporates the control device 300.

As described in detail below, the user interface 400 functions as an operation unit operated by the user in order to form an image in an image forming section 20, and is disposed on the front side of the top portion of the image forming apparatus 1, that is, the front side of an image reading section 110 of the image reading device 100 which will be described below.

Here, the image forming section 20 is an example of an image forming unit.

First, the image reading device 100 will be described.

The image reading device 100 includes the image reading section 110 that reads the image of the document, and a document transport section 120 that transports the document to the image reading section 110.

The document transport section 120 is disposed in the upper portion of the image reading device 100, and the image reading section 110 is disposed in the lower portion of the image reading device 100.

The document transport section 120 includes a document accommodating unit 121 that accommodates documents, and a document discharge unit 122 to which documents transported from the document accommodating unit 121 are discharged. The document transport section 120 transports the documents from the document accommodating unit 121 to the document discharge unit 122.

The image reading section 110 includes a platen glass 111, a light irradiation unit 112 that irradiates a surface to be read (an image surface) of the document with light, a light guiding unit 113 that guides light L emitted from the light irradiation unit 112 to the surface to be read of the document and reflected from the surface to be read of the document, and an image formation lens 114 that forms an optical image of the light L guided by the light guiding unit 113.

The image reading section 110 further includes a detector 115 that photoelectrically converts the image (the optical image) of the light L formed by the image formation lens 114. As the detector 115, for example, a photoelectric conversion element such as a charge coupled device (CCD) image sensor is used.

The image reading section 110 also includes an image processor 116 to which an electric signal obtained by the detector 115 is sent.

Through such a configuration, the image reading section 110 reads an image of a document transported by the document transport section 120 or an image of a document placed on the platen glass 111.

Hereinafter, the image recording device 200 will be described.

The image recording device 200 includes the image forming section 20 that forms an image on a sheet, a sheet feeding section 60 that feeds the sheet P to the image forming section 20, a sheet discharge section 70 that discharges the sheet P on which the image is formed in the image forming section 20, and a reverse transport section 80 that reverses the sheet P on one side surface of which the image is formed in the image forming section 20, and transports the sheet P toward the image forming section 20 again.

The image forming section 20 includes four image forming units 21Y, 21M, 21C, and 21K of yellow (Y), magenta (M), cyan (C), and black (K) arranged in parallel at regular intervals. Each image forming unit 21 includes a photoconductor drum 22, a charger 23 that uniformly charges the surface of the photoconductor drum 22, and a developing unit 24 that develops and visualizes an electrostatic latent image formed by laser irradiation through an optical system unit 50 (to be described below) with a predetermined color component toner.

Toner cartridges 29Y, 29M, 29C, and 29K configured to supply toners of respective colors to the developing units 24 of the image forming units 21Y, 21M, 21C, and 21K are provided in the image forming section 20.

The image forming section 20 includes the optical system unit 50 below the image forming units 21Y, 21M, 21C, and 21K. The optical system unit 50 irradiates the photoconductor drums 22 of the image forming units 21Y, 21M, 21C, and 21K with laser light. The optical system unit 50 includes, in addition to a semiconductor laser and a modulator (not illustrated), a polygon mirror (not illustrated) that deflects and scans laser light emitted from the semiconductor laser, a window (not illustrated) made of glass through which the laser light passes, and a frame (not illustrated) configured to hermetically seal the respective components.

The image forming section 20 includes an intermediate transfer unit 30 that transfers toner images of respective colors formed on the photoconductor drums 22 of the image forming units 21Y, 21M, 21C, and 21K onto an intermediate transfer belt 31 in a superimposed manner, a secondary transfer unit 40 that transfers the toner images formed to be superimposed on the intermediate transfer belt 31 to the sheet P, and a fixing device 45 that fixes the toner images formed on the sheet P by heating and pressing the toner images.

The intermediate transfer unit 30 includes the intermediate transfer belt 31, a drive roller 32 that drives the intermediate transfer belt 31, and a tension roller 33 that applies a predetermined tension to the intermediate transfer belt 31.

The intermediate transfer unit 30 includes plural primary transfer rollers 34 (four primary transfer rollers in this exemplary embodiment) and a backup roller 35. The primary transfer rollers 34 face the photoconductor drums 22 with the intermediate transfer belt 31 interposed therebetween, and transfer the toner images formed on the photoconductor drums 22 onto the intermediate transfer belt 31. The backup roller 35 faces a secondary transfer roller 41 (to be described later) with the intermediate transfer belt 31 interposed therebetween.

The intermediate transfer belt 31 is stretched over plural rotation members such as the drive roller 32, the tension roller 33, the plural primary transfer rollers 34, the backup roller 35, and a driven roller 36.

The intermediate transfer belt 31 is circularly driven in a direction indicated by the arrow at a predetermined speed by the drive roller 32 rotary-driven by a driving motor (not illustrated). A product molded from, for example, rubber or resin is used as the intermediate transfer belt 31.

The intermediate transfer unit 30 includes a cleaning device 37 that removes residual toner or the like present on the intermediate transfer belt 31. The cleaning device 37 removes residual toner and paper dust from the surface of the intermediate transfer belt 31 after the transfer process of the toner images has been completed.

The secondary transfer unit 40 includes the secondary transfer roller 41 that is provided at a secondary transfer position, presses the backup roller 35 via the intermediate transfer belt 31, and secondarily transfers images onto the sheet P. The secondary transfer position at which the toner images transferred to the intermediate transfer belt 31 are transferred to the sheet P is defined by the secondary transfer roller 41 and the backup roller 35 that faces the secondary transfer roller 41 with the intermediate transfer belt 31 interposed therebetween.

The fixing device 45 fixes the images (the toner images) secondarily transferred onto the sheet P by the intermediate transfer unit 30, to the sheet P using heat and pressure by a heat-fixing roller 46 and a pressure roller 47.

The sheet feeding section 60 includes sheet feeding trays 61 that accommodate sheets on which images are to be recorded, delivery rollers 62 each of which delivers the sheets P accommodated in corresponding one of the sheet feeding trays 61, a transport path 63 through which the sheets P delivered by the delivery rollers 62 are transported, and transport rollers 64, 65, and 66 that are disposed along the transport path 63 and transport the sheets P delivered by the delivery rollers 62 to the secondary transfer position.

The sheet discharge section 70 includes a first loading tray 71 provided above the image forming section 20 to be loaded with a sheet on which an image is formed in the image forming section 20, and a second loading tray 72 provided between the first loading tray 71 and the image reading device 100 to be loaded with a sheet on which an image is formed in the image forming section 20.

The sheet discharge section 70 includes a transport roller 75 that is provided downstream of the fixing device 45 in the transport direction to transport the sheet P to which the toner images are fixed, and a switching gate 76 provided downstream of the transport roller 75 in the transport direction to switch the transport direction of the sheet P.

The sheet discharge section 70 includes transport roller 77 downstream of the switching gate 76 in the transport direction. The first discharge roller 77 discharges the sheet P transported to one side (the right side in FIG. 2) in the transport direction switched by the switching gate 76, to the first loading tray 71.

The sheet discharge section 70 includes a transport roller 78 and a second discharge roller 79 which are provided downstream of the switching gate 76 in the transport direction. The transport roller 78 transports the sheet P transported to the other side (the upper side in FIG. 2) in the transport direction switched by the switching gate 76. The second discharge roller 79 discharges the sheet P transported by the transport roller 78 to the second loading tray 72.

The reverse transport section 80 includes a reverse transport path 81 on the side of the fixing device 45. A reversed sheet P is transported through the reverse transport path 81 when the transport roller 78 rotates in the direction opposite to the direction in which the sheet P is discharged to the second loading tray 72. Plural transport rollers 82 are provided along the reverse transport path 81 in the reverse transport path 81. The sheet P transported by the transport rollers 82 is fed again to the secondary transfer position by the transport rollers 82.

The image recording device 200 includes an apparatus body frame 11 and an apparatus housing 12. The apparatus body frame 11 directly or indirectly supports the image forming section 20, the sheet feeding section 60, the sheet discharge section 70, the reverse transport section 80, and the control device 300. The apparatus housing 12 is attached to the apparatus body frame 11 to form the outer surface of the image forming apparatus 1.

The apparatus body frame 11 includes a reading apparatus support 13 that includes the switching gate 76, the first discharge roller 77, the transport roller 78, the second discharge roller 79, and the like therein at one end side in the lateral direction of the image forming apparatus 1. The reading apparatus support 13 vertically extends to support the image reading device 100. The reading apparatus support 13 supports the image reading device 100 in cooperation with an inner portion of the apparatus body frame 11.

The image recording device 200 includes a front cover 15 as a part of the apparatus housing 12. The front cover 15 is provided at the front side of the image forming section 20 and is attached to the apparatus body frame 11 to be openable and closable.

Figure 3:
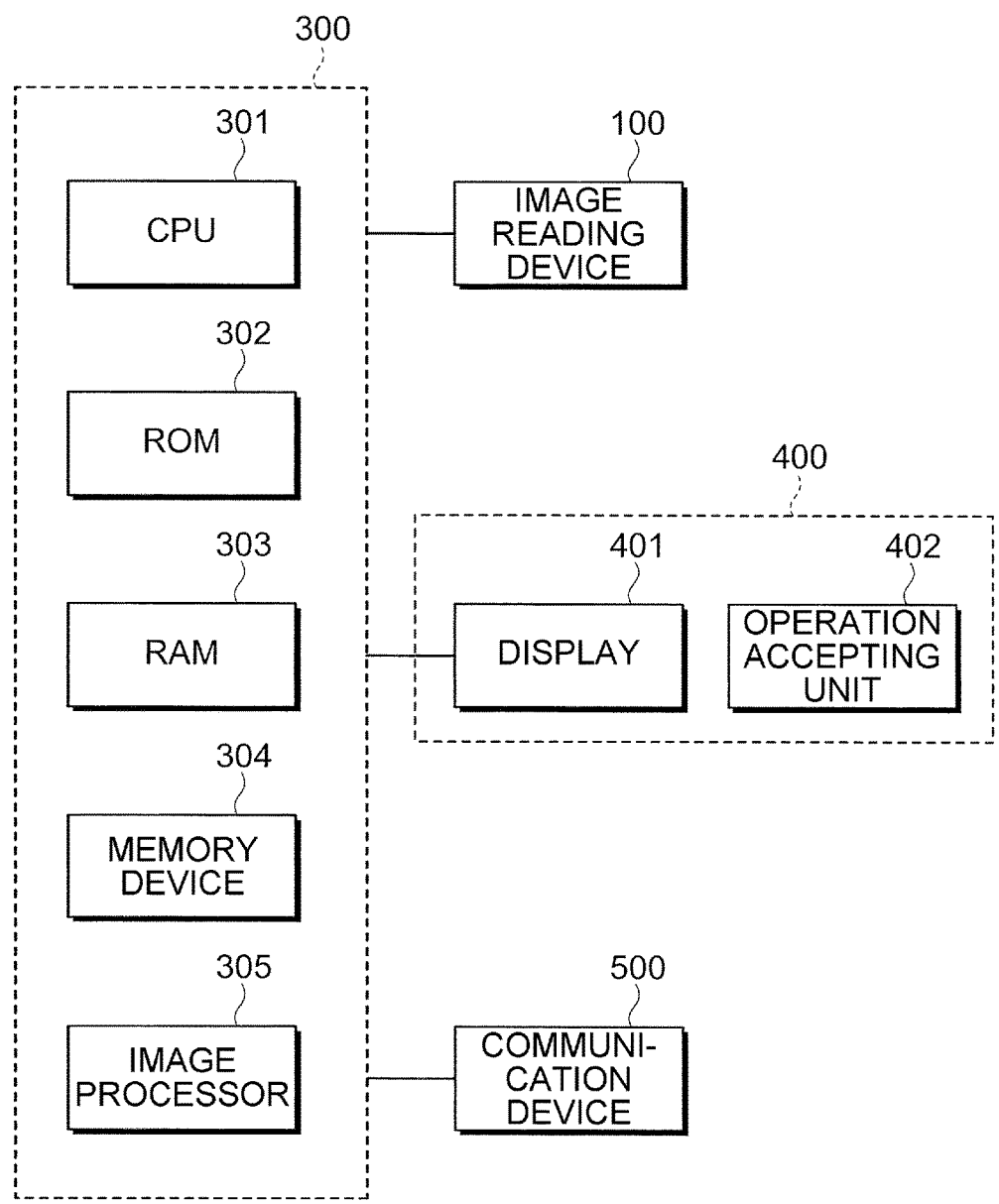
FIG. 3 is a view schematically illustrating a connection configuration between a control device incorporated in an image recording device and other devices.

FIG. 3 is a view schematically illustrating a connection configuration between the control device 300 incorporated in the image recording device 200 and other devices.

The control device 300 includes a controller (a CPU 301, a ROM 302, and a RAM 303) that controls the entire apparatus, a memory device 304 used for storing image data and the like, and an image processor 305 that applies image processing such as color correction, tone correction, and the like to the image represented by the image data. The control device 300 is an example of an information processing apparatus.

The CPU 301 executes a program read from the ROM 302 using the RAM 303 as a work area and provides various functions including a collective adjustment function to be described below.

The memory device 304 is configured with a hard disk device, a semiconductor memory, and the like, and stores data concerning an image of a document read by the image reading device 100 and an image received through a communication device 500 to be described below. The memory device 304 is also used for storing a program as necessary.

The image processor 305 is configured as, for example, a dedicated processor or a processing board, and executes image processing such as color correction, tone correction, and the like.

The user interface 400 includes a display 401 that is used for displaying an operation screen and the like, and an operation accepting unit 402 that accepts an input operation by a user. The display 401 is configured with, for example, a liquid crystal display panel or an organic electro luminescence (EL) display panel. The operation accepting unit 402 is configured with, for example, a button, a switch, a touch panel, and the like. The touch panel is superimposed on the surface of the display 401.

The communication device 500 is configured with, for example, a modem or a LAN interface, and is used for facsimile communication or communication with an external device.

Figure 4:
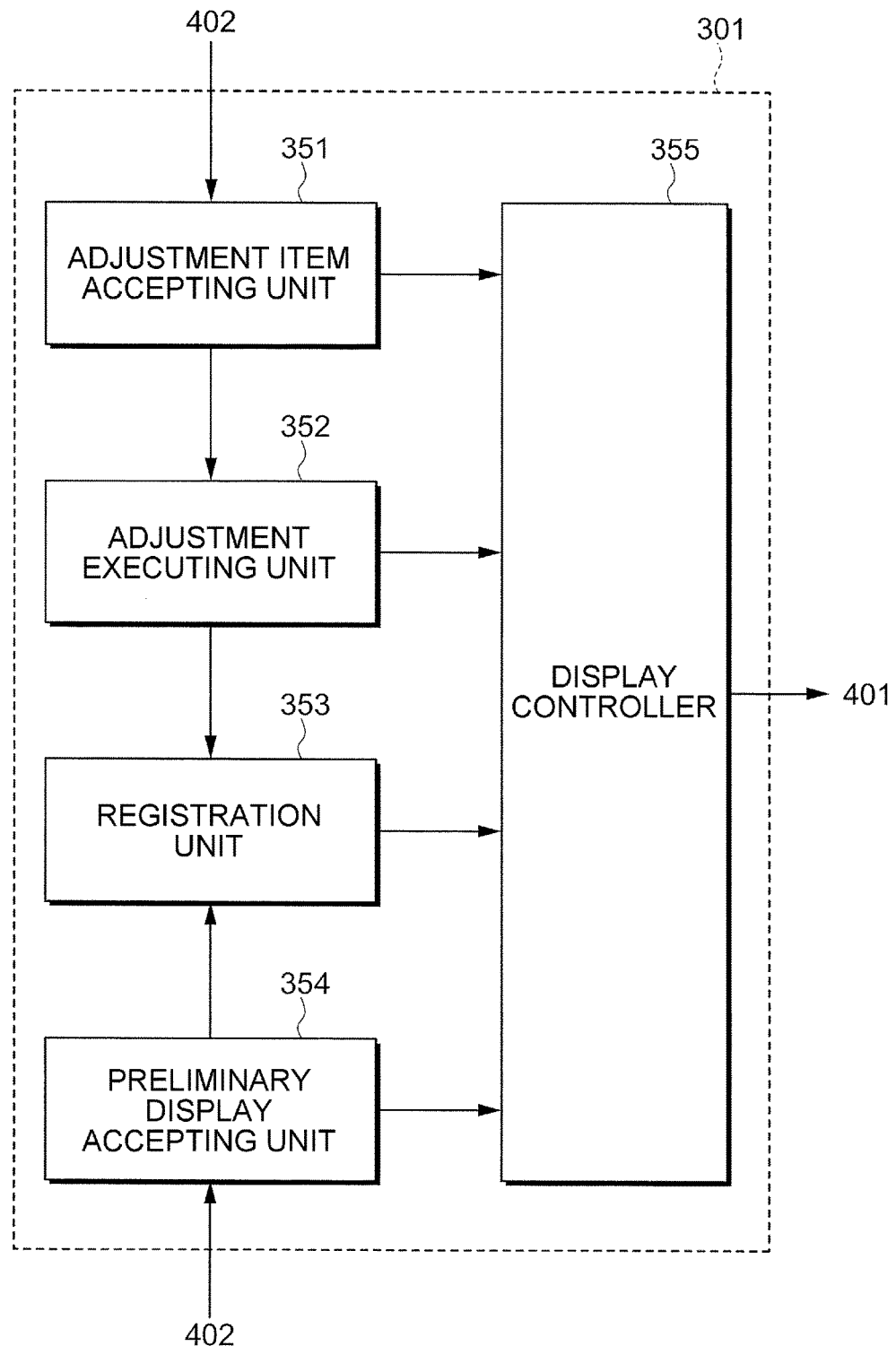
FIG. 4 is a view illustrating a configuration example of software related to a function of collectively executing plural adjustment items.

FIG. 4 is a view illustrating a configuration example of software related to a function of collectively executing plural adjustment items (hereinafter, referred to as a "collective adjustment function"). The collective adjustment function is one example of various processing functions implemented through a program execution.

The CPU 301 as the collective adjustment function includes a functional unit (an adjustment item accepting unit 351) that accepts adjustment items through, for example, the operation accepting unit 402, a functional unit (an adjustment executing unit 352) that executes automatic correction concerning the accepted adjustment items, a registration unit 353 that registers the adjustment result in a designated reflection destination, a preliminary display accepting unit 354 that accepts a setting concerning a reflection destination of the adjustment result through the operation accepting unit 402, and a display controller 355 that displays a screen related to the collective adjustment function on the display 401.

The adjustment item accepting unit 351 is a functional unit that displays an adjustment function selection screen (see FIG. 5) on the display 401 through the display controller 355, and selectively accepts plural adjustment items to be collectively adjusted from the screen. The adjustment item accepting unit 351 is an example of an accepting unit.

In this exemplary embodiment, the plural adjustment items displayed on the adjustment function selection screen (see FIG. 5) are arranged in a recommended order of execution of adjustment operations. Details will be described below.

The adjustment item accepting unit 351 also has a function of displaying, on the display 401, a screen (see FIG. 8) through which selection as to whether the reflection destination of the adjustment result is a temporary stock or a custom stock is accepted, for adjustment items for which reflection destinations are selectable. In this exemplary embodiment, the screen herein is displayed by when a target adjustment result is reflected.

The adjustment executing unit 352 is a functional unit that executes adjustment operations corresponding to the plural adjustment items selected or designated by a user in the recommended order. The contents of the adjustment operation executed corresponding to each adjustment item are determined in advance.

The adjustment executing unit 352 has a function of automatically generating a custom stock for an adjustment item for which a temporary stock is designated as a reflection destination of an adjustment result and reflecting the adjustment result in the generated custom stock.

The registration unit 353 is a functional unit that registers the adjustment result obtained through the adjustment executing unit 352 in a predetermined reflection destination (e.g., an alignment, a stock, or a tray) or the like. In this exemplary embodiment, the stocks as examples of the reflection destination include a temporary stock and a custom stock.

The custom stock refers to a setting that is saved in a stock list to be capable of being reused. The temporary stock refers to a setting that is not saved in the stock list, is valid only for a tray as an allocation destination, and is maintained until another setting is overwritten.

The setting created or edited as the custom stock may be selected from the stock list, and then allocated to other trays. For example, in the case where the setting is the custom stock, even when it is desired to restore the setting after another stock is allocated to a tray to which a "custom stock 1" is allocated, it is possible to allocate the same setting again to the tray by selecting the "custom stock 1" from the stock list.

The setting created as the temporary stock does not remain in the stock list, and thus may not be allocated to another tray. For example, in the case where the setting is the temporary stock, when another stock is allocated to a tray to which a "temporary stock 1" is allocated, information of the "temporary stock 1" is deleted and lost. It should be noted that as long as the temporary stock is allocated to the tray, the information is kept allocated even when the power is switched from OFF to ON. The contents of the temporary stock may be erased by powering off the image forming apparatus 1.

For example, when a user wants to perform printing using a setting different from the settings saved in the stock list only in this job, the user performs printing using a temporary stock without setting the changed setting as a custom stock (without saving the changed setting in the stock list). When a user wants to use the setting in future or to apply the setting to another tray, he/she creates the setting as a custom stock.

Figure 7:
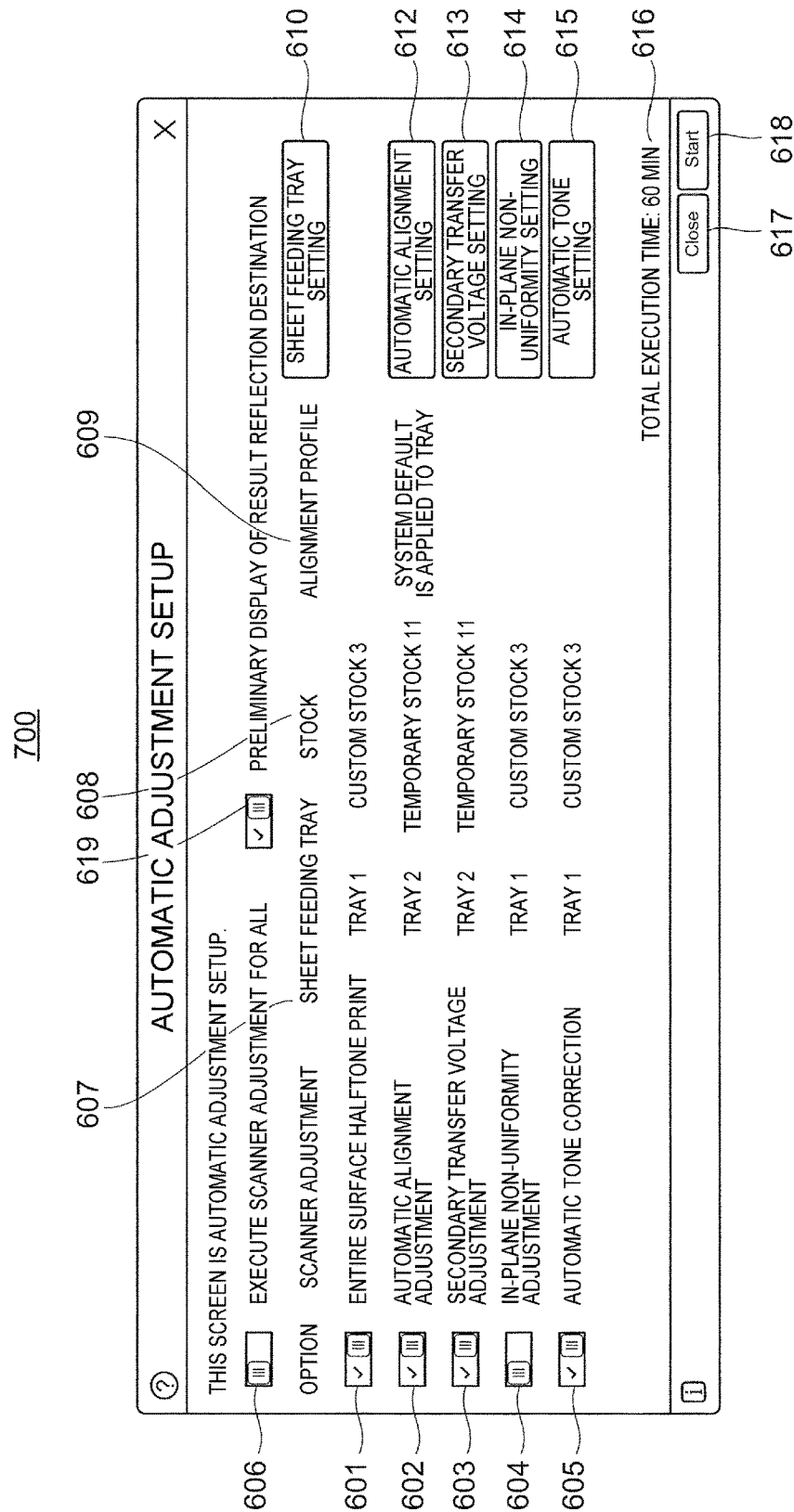
FIG. 7 is a view illustrating a display example of a preliminary display accepting screen.

The preliminary display accepting unit 354 is a functional unit that selectively accepts a setting concerning preliminary display of the reflection destination through a preliminary display accepting screen (see FIG. 7).

In this exemplary embodiment, on the preliminary display accepting screen, a button is displayed so as to make selection as to whether or not to enable the function (the preliminary display function) of displaying the generation of a new setting (e.g., an alignment or a custom stock) and the reflection of the adjustment result prior to displaying of the completion screen. Details of the preliminary display accepting screen will be described below.

The display controller 355 is a functional unit that displays various screens saved in the ROM 302 or the memory device 304 on the display 401 according to the progress of the collective adjustment function. Here, the screens include an initial screen (see FIG. 5), an under-adjustment screen (see FIGS. 9 to 12), a completion screen (see FIG. 13) and the like. The display controller 355 reflects instruction information accepted by the adjustment item accepting unit 351 in the display of each screen.

Hereinafter, an example of the initial screen prepared for the collective adjustment function will be described.

Figure 5:
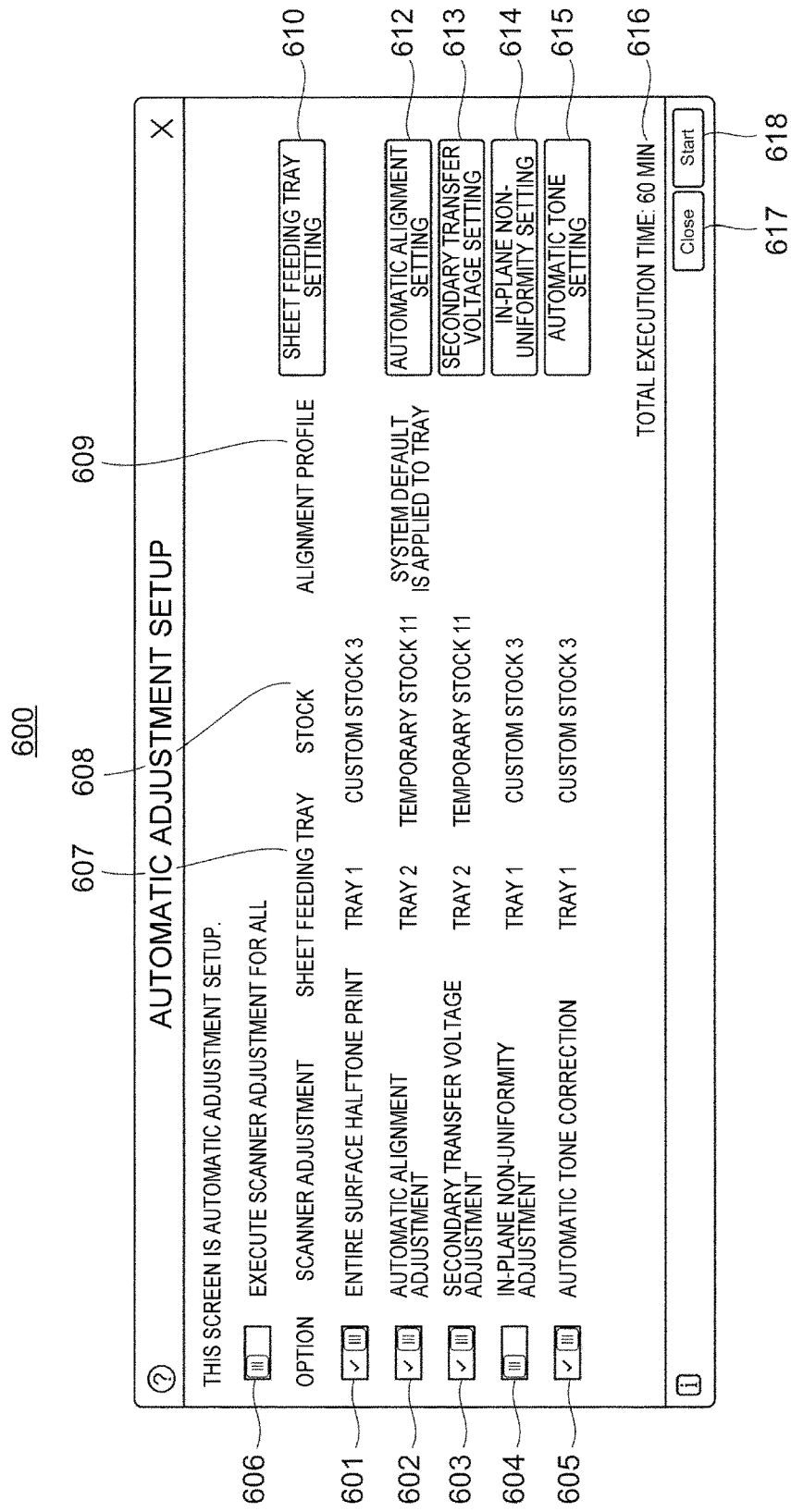
FIG. 5 is a view illustrating an example of an initial screen.

FIG. 5 is a view illustrating an example of an initial screen 600. The initial screen 600 illustrated in FIG. 5 is titled "automatic adjustment setup."

On the initial screen 600 illustrated in FIG. 5, five selection boxes 601 to 605 corresponding to five adjustment items which are selectable in the collective adjustment function are prepared. The selection boxes 601 to 605 are used when adjustment items are individually selected. On the initial screen 600, a selection box 606 used for selecting all the five adjustment items by a single operation is also prepared.

The adjustment items selectable in this exemplary embodiment include the five items, that is, an entire surface halftone print function (uniform halftone print), an automatic alignment adjustment function (auto alignment adjustment), a secondary transfer voltage adjustment function (2nd bias transfer roll auto adjustment), an in-plane non-uniformity adjustment function (auto density adjustment), and an automatic tone correction function (auto TRC adjustment).

On the initial screen 600, the five adjustment items are arranged in the recommended execution order.

In FIG. 5, the entire surface halftone print function placed at the top rank has a higher execution order than the other four adjustment items, and the automatic alignment adjustment function located second from the top has a higher execution order than the other three adjustment items. Subsequently, the lower the arrangement location is, the lower the execution order is. In this exemplary embodiment, the automatic tone correction function placed at the lowest rank has the lowest execution order.

In this exemplary embodiment, the adjustment executing unit 352 is configured such that when some of the five adjustment items are selected as collective adjustment targets, the adjustment executing unit 352 executes corresponding adjustment operations in decreasing order of the arrangement ranks on the initial screen 600 regardless of the selection order of the individual adjustment items. The reason will be described below.

Hereinafter, contents of the individual adjustment items will be described.

The entire surface halftone print function is an adjustment item in which a printed surface of a sheet on which halftone is entirely printed is read by the image reading section 110 so that a spot/streak detection and a banding detection are executed.

The spot/streak detection is an adjustment aimed at detecting image quality defects (e.g., a color spot, a white spot, a color streak, and a white streak) and measures a degree of image quality defects and the number of defects by reading the printed surface.

The banding detection is an adjustment aimed at detecting banding (a color streak extending in the main scanning direction) and measures a pitch and a degree of banding by reading the printed surface.

It is known that when it is determined that there is an image quality defect through the spot/streak detection, the recovery of image quality may not be expected even if adjustment operations are executed by other adjustment items. Thus, in this exemplary embodiment, the entire surface halftone print function is placed at the top rank on the initial screen 600. That is, the entire surface halftone print function is an adjustment item to be executed first among the five adjustment items.

The reason why the banding detection is also executed in the entire surface halftone print function is that the halftone printed on the entire surface of the sheet for the spot/streak detection may also be used for the banding detection. Only the spot/streak detection may be executed as the entire surface halftone print function. Alternatively, such a mechanism may be employed that the banding detection is not executed if it is determined that an image quality defect is present through the spot/streak detection.

The automatic alignment adjustment function is an adjustment item aimed at correcting a deviation of a shape of an image printed on the sheet and a position of the image printed on the sheet with respect to respective design values. In the automatic alignment adjustment, grid coordinates of a grid pattern printed on the printed surface are read by the image reading section 110, and the relationship between an image shape and a drawing position is corrected based on the comparison result between the measured grid coordinates and the design values.

The secondary transfer voltage adjustment function is an adjustment item aimed at correcting a transfer failure of toner images from the intermediate transfer belt 31 to the sheet P. In the secondary transfer voltage adjustment function, a test chart printed at different transfer voltages in a stepwise fashion is read by the image reading section 110, and a transfer voltage value is corrected based on the comparison result between the read values and the design values to obtain higher image quality.

The in-plane non-uniformity adjustment function is an adjustment item aimed at correcting a density non-uniformity in the main scanning direction of the sheet. In the in-plane non-uniformity adjustment function, a printed surface on which a test chart having a uniform halftone dot area ratio in the main scanning direction is printed is read by the image reading section 110, and a light amount profile of an optical writing device (ROS: Raster Output Scanner) is corrected based on a change appearing in the read values so that the in-plane non-uniformity becomes small.

The automatic tone correction function is an adjustment item aimed at correcting a deviation of a density gradation with respect to the design values. In the automatic tone correction function, a printed surface on which a test chart is printed with density being changed in a stepwise fashion is read by the image reading section 110, and correction values (LUT: Lookup Table) used for correcting an error based on the comparison result between the read values and the design values are created.

In this exemplary embodiment, the reason why the secondary transfer voltage adjustment function is placed at a higher rank than the in-plane non-uniformity adjustment function and the automatic tone correction function are placed on the initial screen 600 (that is, the reason why the secondary transfer voltage adjustment function is executed prior to the in-plane non-uniformity adjustment function and the automatic tone correction function) is that there is a possibility that a chart having an incorrect density may be generated unless the secondary transfer voltage adjustment function is performed first, and thus the test chart used in the in-plane non-uniformity adjustment function and the automatic tone correction function is affected.

The reason why the automatic tone correction function is arranged below the in-plane non-uniformity adjustment function on the initial screen 600 (that is, the reason why the automatic tone correction function is executed after the in-plane non-uniformity adjustment function) is that unless the in-plane non-uniformity adjustment function is performed first, the density of the output chart for tone correction is largely affected. Since a patch is divided in the main scanning direction, the influence of in-plane non-uniformity is large, and the incorporation of in-plane non-uniformity information improves the adjustment precision.

The initial screen 600 illustrated in FIG. 5 represents a display example when the selection box 606 for collective designation has not been selected (that is, when individual settings of adjustment items have been selected). Specifically, among the selection boxes 601 to 605 prepared individually for the five adjustment items, only four adjustment items selected by a user are displayed in a selected state (a state where checkboxes are checked).

Selected are four items, that is, an entire surface halftone print function, an automatic alignment adjustment function, a secondary transfer voltage adjustment function, and an automatic tone correction function. The display related to the in-plane non-uniformity adjustment function which has not been selected is displayed in gray-out.

When the selection box 606 for collective designation has been selected, all the five selection boxes 601 to 605 which are individually prepared are displayed in the selected state (the state where checkboxes are checked).

On the initial screen 600, a display field 607 that displays a sheet feeding tray 61 and a display field 608 that displays a stock are also prepared to allow the user to check (i) a tray for which the user performs adjustment and (ii) a stock and an alignment allocated to the tray.

In the example of FIG. 5, allocation of "custom stock 3" to "tray 1" and allocation of "temporary stock 11" to "tray 2" are displayed.

In addition, on the initial screen 600, a display field 609 is prepared to display information concerning an adjustment profile to be applied.

On the initial screen 600, buttons 610 to 615 are prepared so as to perform detailed settings concerning the sheet feeding trays 61 and the individual adjustment items.

The button 610 is used for detailed settings of the sheet feeding trays, the button 612 is used for detailed settings of the automatic alignment adjustment function, the button 613 is used for detailed settings of the secondary transfer voltage adjustment function, the button 614 is used for detailed settings of the in-plane non-uniformity adjustment function, and the button 615 is used for detailed settings of the automatic tone correction function.

On the initial screen 600, a display field 616 concerning a total execution time for the selected adjustment items, a close button 617 used for closing the screen, and a start button 618 used for instructing the execution of the collective adjustment function are also arranged. In the example of FIG. 5, it is exemplified that the time required for executing the collective adjustment function in which all the adjustment items are selected is 60 minutes.

When the execution of the collective adjustment function is instructed after the above described initial setting work is completed, a collective adjustment operation to be performed by the control device 300 is initiated according to the set contents.

Subsequently, the execution example of the collective adjustment function executed by the control device 300 will be described.

Figure 6:
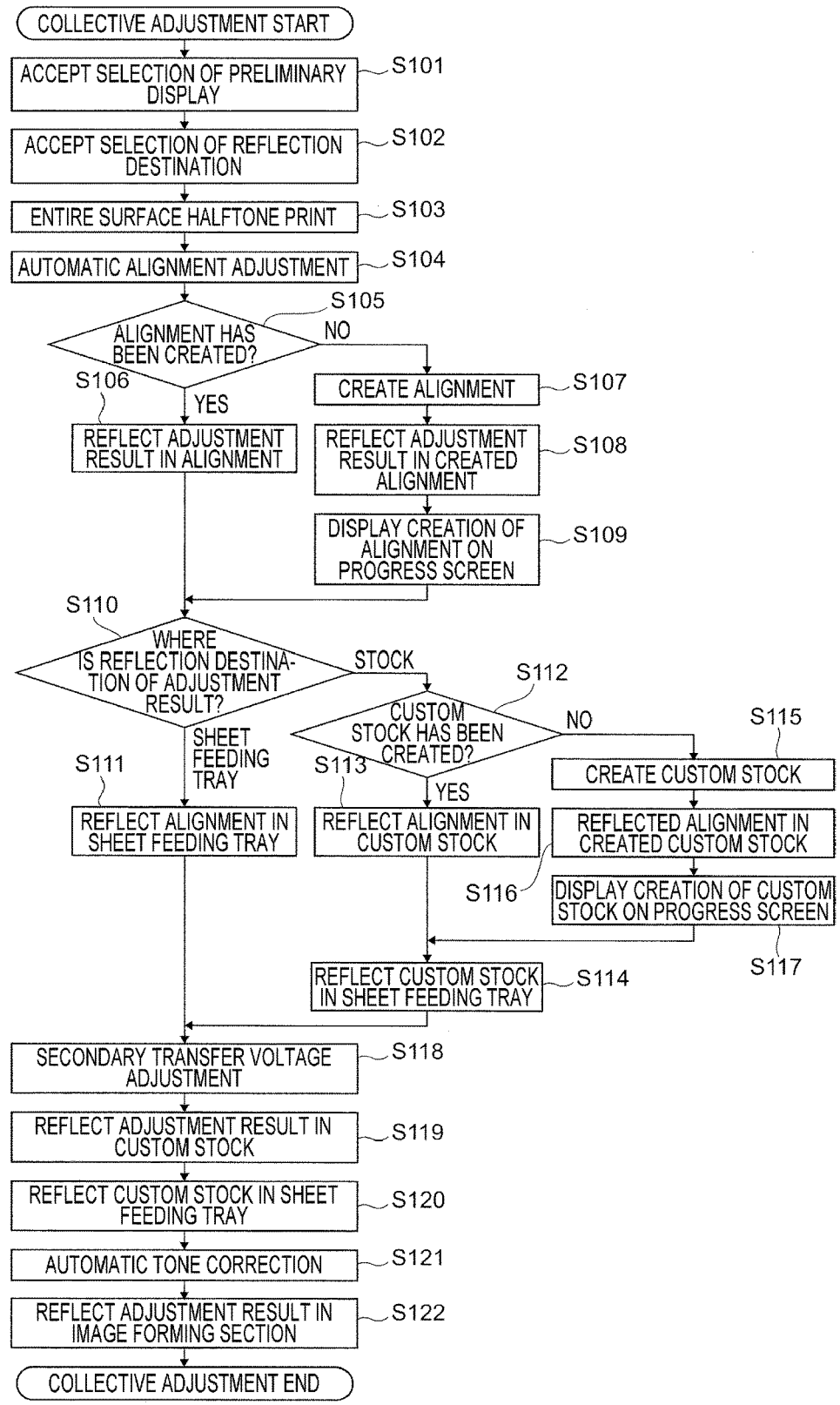
FIG. 6 is a flow chart illustrating a flow of an operation when the execution of four adjustment items is instructed for a collective adjustment function.

FIG. 6 is a flow chart illustrating a flow of an operation when the execution of four adjustment items is instructed for a collective adjustment function.

When the collective adjustment function is initiated, the control device 300 displays a screen (a preliminary display accepting screen) used for selecting whether or not to display a reflection destination on the screen in the case where a new custom stock is generated as the reflection destination during adjustment operations (step S101).

FIG. 7 is a view illustrating a display example of a preliminary display accepting screen 700. In FIG. 7, the same reference numerals are given to the parts corresponding to those in FIG. 5. The preliminary display accepting screen 700 has a configuration in which a selection box 619 used for accepting whether or not to enable the function of displaying the reflection destination of the adjustment result prior to the completion of the adjustment operations (that is, in advance) is added to the initial screen 600. The selection box 619 for the preliminary display function may be displayed at the time of displaying the initial screen 600.

In the example of FIG. 7, the preliminary display function is enabled (the selection box 619 is checked).

In this exemplary embodiment, when a predetermined time has elapsed from the display of the preliminary display accepting screen 700, the selection state of the selection box 619 at that time is determined and the process proceeds to the next step.

Return back to the description for FIG. 6. Next, when an adjustment item for which the reflection destination of the adjustment result is selectable is included in adjustment items selected as collective adjustment items, the control device 300 displays a screen for accepting selection of the reflection destination (step S102).

Figure 8:
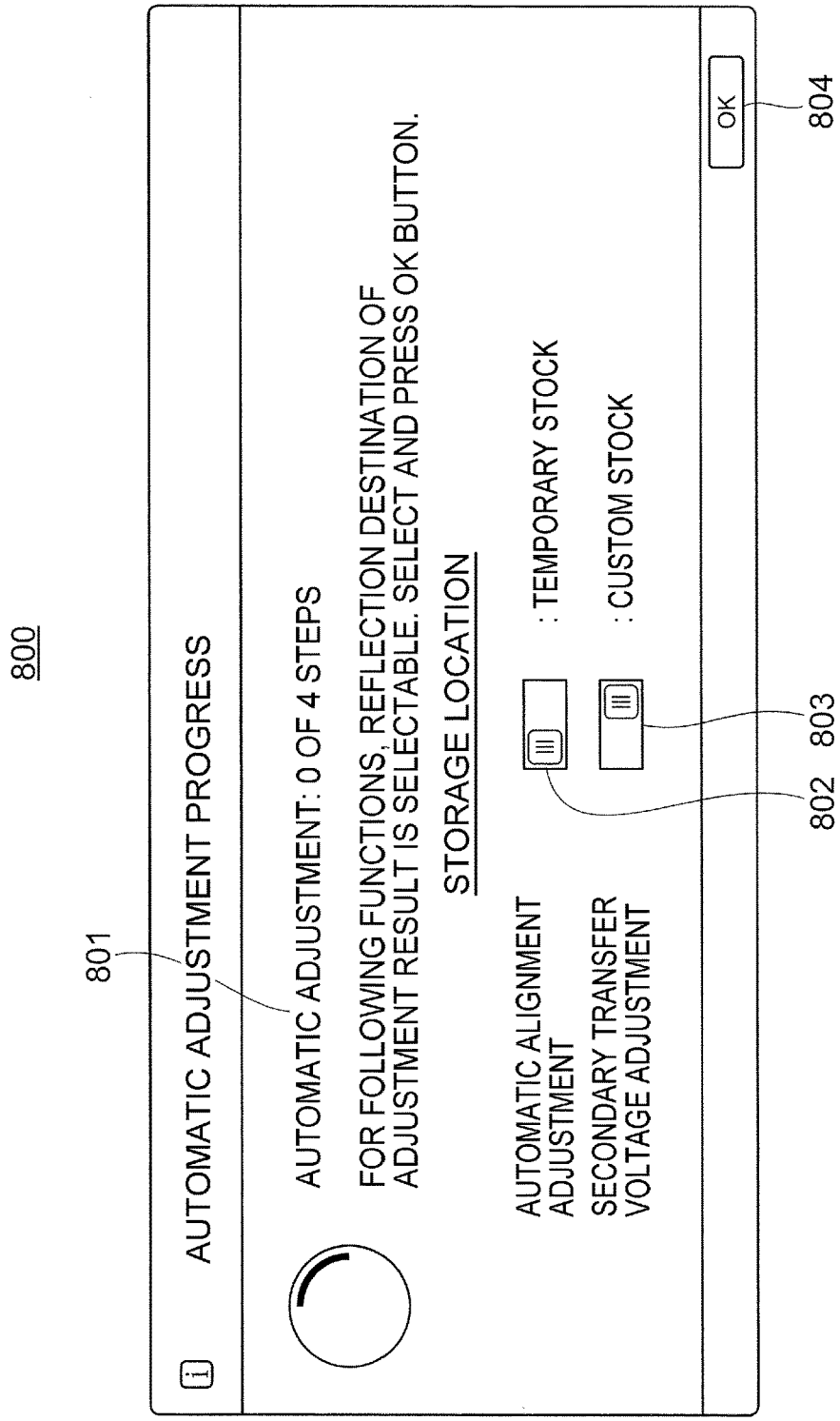
FIG. 8 is a view illustrating a display example of a reflection destination selecting screen.

FIG. 8 is a view illustrating a display example of a reflection destination selecting screen 800.

Since a collective adjustment operation has been initiated at the time of display of the reflection destination selecting screen 800, the screen is titled "automatic adjustment progress." The reflection destination selecting screen 800 is displayed before the adjustment operation concerning the adjustment item for which the reflection destination is selectable is completed.

In the example of the reflection destination selecting screen 800 illustrated in FIG. 8, "0 of 4 Steps" is displayed on a display field 801 indicating the progress stage and indicates that none of adjustment operations is completed.

In this exemplary embodiment, two items, that is, the automatic alignment adjustment function and the secondary transfer voltage adjustment function are adjustment items for which the reflection destinations of the adjustment results are selectable. Thus, on the reflection destination selecting screen 800, two boxes, that is, a selection box 802 corresponding to the automatic alignment adjustment function and a selection box 803 corresponding to the secondary transfer voltage adjustment function are displayed.

In the example of FIG. 8, for the automatic alignment adjustment function, a temporary stock has been selected as a reflection destination. For the secondary transfer voltage adjustment function, a custom stock has been selected as a reflection destination. When a confirm button 804 in the drawing is clicked, the selection on the screen is confirmed.

The number of selection boxes to be displayed depends on the number of selectable adjustment items. In this exemplary embodiment, when a predetermined time has elapsed from the display of the reflection destination selecting screen 800, the adjustment operations proceed with the settings of the initial screen 600.

When there is no adjustment item for which the reflection destination is selectable among adjustment items selected by the user, the reflection destination selecting screen 800 is not displayed.

Return back to the description for FIG. 6. Then, the control device 300 executes an adjustment operation corresponding to the entire surface halftone print function (step S103). As described above, the entire surface halftone print function is placed at the top rank on the initial screen 600.

If it is determined that an image quality defect is present through a spot/streak detection, the execution of adjustment operations concerning the three subsequent adjustment items is skipped. That is, the collective adjustment function ends without executing the adjustment operations concerning the three subsequent adjustment items. FIG. 6 illustrates a processing operation in the case based on the assumption that no image quality defect has been found through the spot/streak detection.

It is possible to employ another configuration in which even if an image quality defect is detected through the spot/streak detection of the entire surface halftone print function, the execution of the three subsequent adjustment items is not skipped. In this case, the image quality defect is saved as a record.

When the entire surface halftone print function ends herein, a progress screen is displayed on the display 401.

Figure 9:
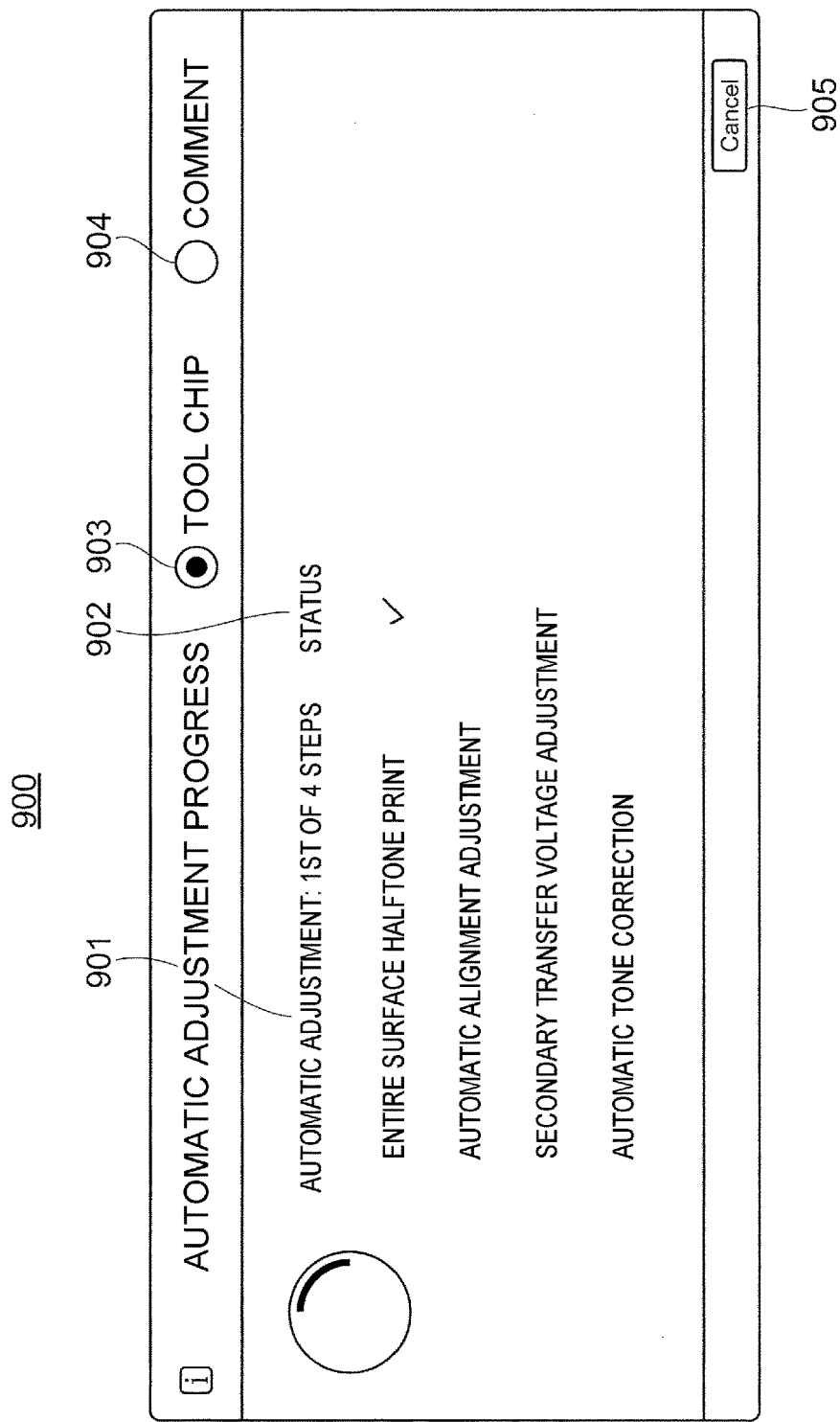
FIG. 9 is a view illustrating a display example of a progress screen at a time when an entire surface halftone print function ends.

FIG. 9 is a view illustrating a display example of a progress screen 900 at the time when the entire surface halftone print function has ended.

The progress screen 900 is titled "automatic adjustment progress." In the example of the progress screen 900, "1st of 4 Steps" is displayed on a display field 901 showing the progress stage, and a check mark indicating the completion of processing is displayed on a status field 902 corresponding to the entire surface halftone print function.

In addition, on the progress screen 900, selection buttons 903 and 904 used for designating a method for displaying information when the preliminary display function is enabled are provided.

The selection button 903 corresponds to the display in a tool chip format, and the selection button 904 corresponds to the display in a comment format. Here, the tool chip format refers to a format in which a small frame appears with the condition that a user places a cursor on a specific icon (an information mark), and supplemental information is displayed within the frame. The comment format refers to a format in which supplemental information is displayed without requiring user operation.

When a cancel button 905 on the screen is clicked, the collective adjustment operation is forcibly terminated. It is possible to employ a structure in which the selection buttons 903 and 904 are displayed on the same screen when the preliminary display function has been selected on the preliminary display accepting screen 700 illustrated in FIG. 7.

Return back to the description for FIG. 6. Next, the control device 300 executes an adjustment operation corresponding to the automatic alignment adjustment function (step S104).

That is, a processing of obtaining adjustment information (alignment) required for obtaining an image having a designed shape at a position as designed is executed.

Here, the control device 300 determines whether an alignment storing the adjustment result of an automatic alignment has been created (step S105).

If the alignment has been created (a positive result is obtained), the control device 300 reflects the adjustment result in the existing alignment (step S106).

If the alignment has not been created (a negative result is obtained), the control device 300 creates a new alignment (step S107). In this exemplary embodiment, an "alignment profile 99" is created.

Subsequently, the control device 300 reflects the adjustment result in the created alignment (step S108).

Subsequently, the control device 300 displays that anew alignment has been created as a reflection destination, on the progress screen 900 (see FIG. 10).

Figure 10:
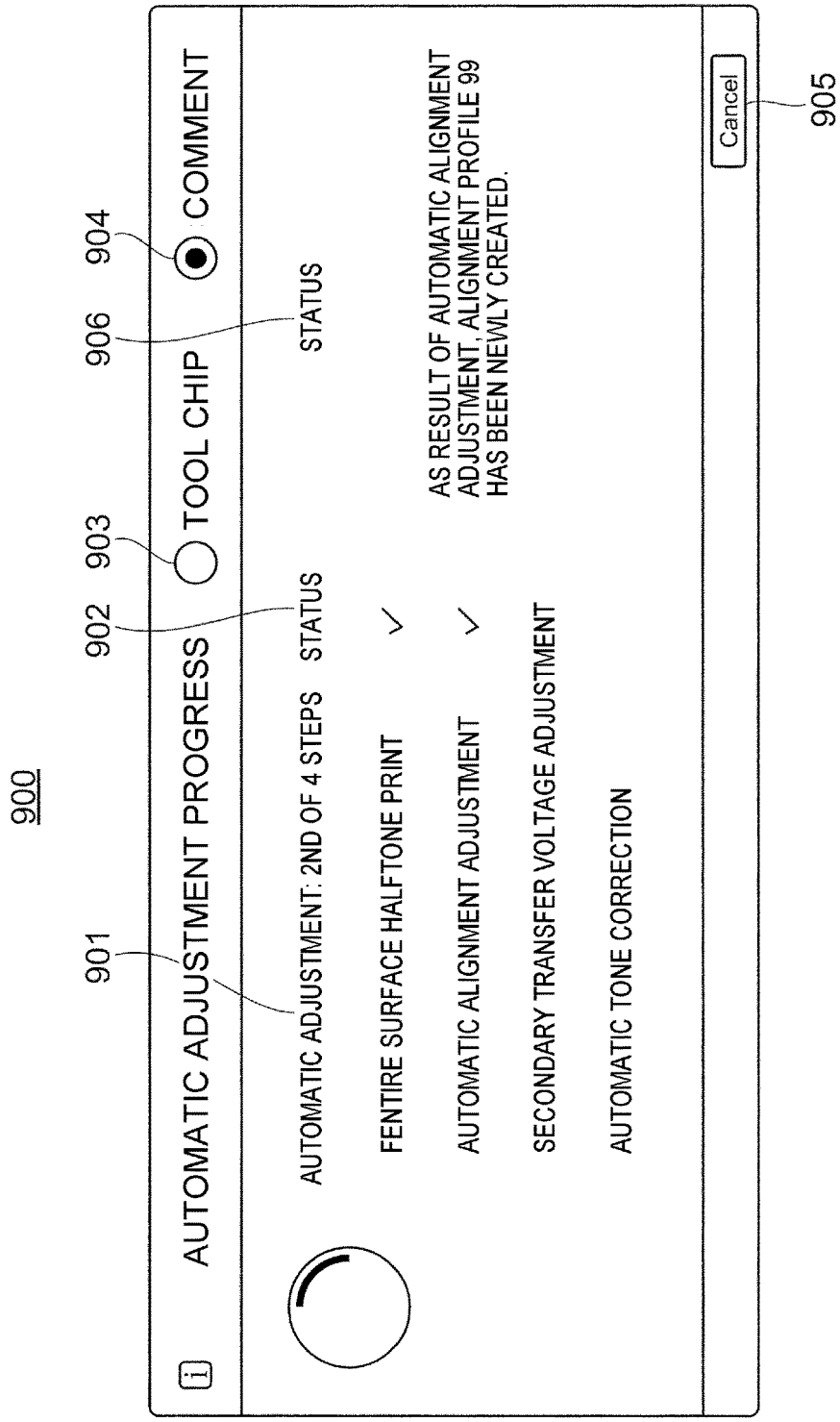
FIG. 10 is a view illustrating a display example when a new alignment profile has been generated.

FIG. 10 is a view illustrating a display example when a new alignment profile has been generated. In FIG. 10, the same reference numerals are given to the parts corresponding to those in FIG. 9.

The example of FIG. 10 corresponds to a display screen when the selection button 904 for displaying information in the comment format has been selected.

In the case of FIG. 10, since the automatic alignment adjustment function has ended, "2nd of 4 Steps" is displayed on the display field 901 showing the progress stage, and a check mark indicating the completion of processing is displayed on the status field 902 corresponding to the automatic alignment adjustment function.

Since the preliminary display function is enabled, a comment field 906 displays that "as a result of automatic alignment adjustment, an alignment profile 99 is newly generated."

With this display, the user may grasp the progress status of adjustment operations without waiting for completion of the adjustment operations. For example, when it is assumed that the adjustment result of the automatic alignment is saved in the existing alignment, the user who knows that the new alignment has been generated may instruct the automatic adjustment operation to be redone without waiting for the completion of the adjustment operations.

Next, descriptions will be made with respect to a display example when display in the tool chip format has been selected on the progress screen 900.

Figure 11:
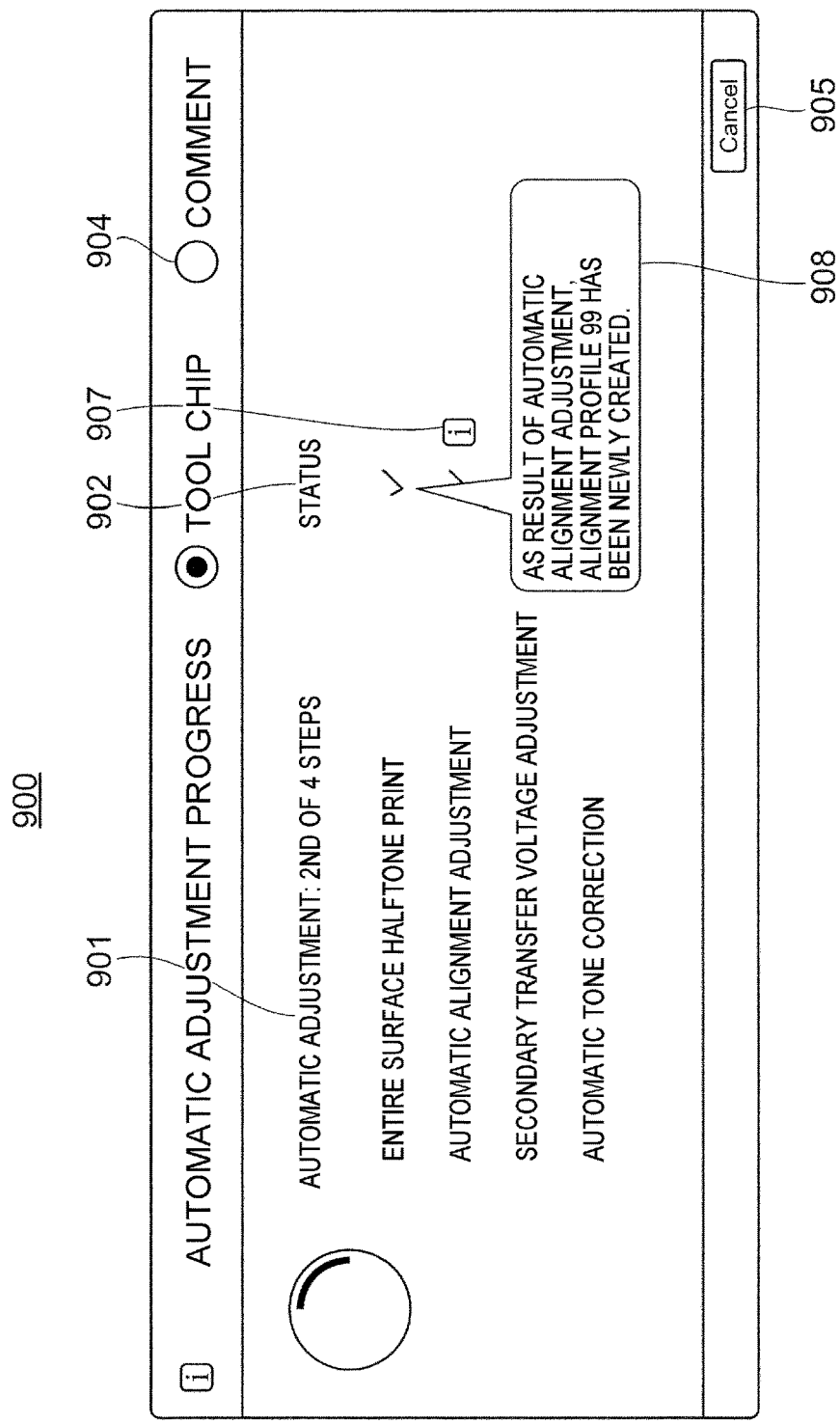
FIG. 11 is a view illustrating another display example when a new alignment profile has been generated.

FIG. 11 is a view illustrating another display example when a new alignment profile has been generated. In FIG. 11, the same reference numerals are given to the parts corresponding to those in FIG. 9.

FIG. 11 corresponds to a display example when the selection button 903 for displaying information in the tool chip format has been selected, and displays a display state after an icon (information mark) 907 suggesting generation of a new setting is clicked.

A balloon-shaped frame 908 displays that "as a result of automatic alignment adjustment, an alignment profile 99 is newly generated."

The frame 908 is displayed when the icon 907 is clicked. That is, the frame 908 is not displayed unless the user wants to confirm the contents of a newly generated setting.

Return back to the description for FIG. 6. Next, the control device 300 determines whether a sheet feeding tray has been designated or a stock has been designated as a reflection destination of the adjustment result (step S110).

Here, the designation of the sheet feeding tray means that the adjustment result is to be used only at the execution time, and the designation of the stock means that the adjustment result is stored to be referred to by other operations.

If the sheet feeding tray 61 has been designated, the control device 300 reflects the alignment (the adjustment result) in the sheet feeding tray 61 designated in advance (step S111). As described above, reflecting the alignment result in the sheet feeding tray ensures that the subsequent adjustment operations make the adjustment with no positional deviation.

If the stock (including a temporary stock) has been designated, the control device 300 determines whether a custom stock for storing the adjustment result of the collective adjustment function has been created (step S112).

If the custom stock has been created (in the case of a positive result), the control device 300 reflects the alignment (the adjustment result) in the corresponding existing custom stock (step S113), and then, reflects the corresponding existing custom stock in the designated sheet feeding tray (step S114).

If the custom stock has not been created (in the case of a negative result), the control device 300 newly creates a custom stock as the reflection destination (step S115), and reflects the alignment (the adjustment result) in the created custom stock (step S116).

The information recorded in the temporary stock (a temporary stock 11 in this exemplary embodiment) is inherited to the newly generated custom stock.

Thereafter, the control device 300 displays that the new custom stock has been generated on the progress screen 900 (step S117).

Figure 12:
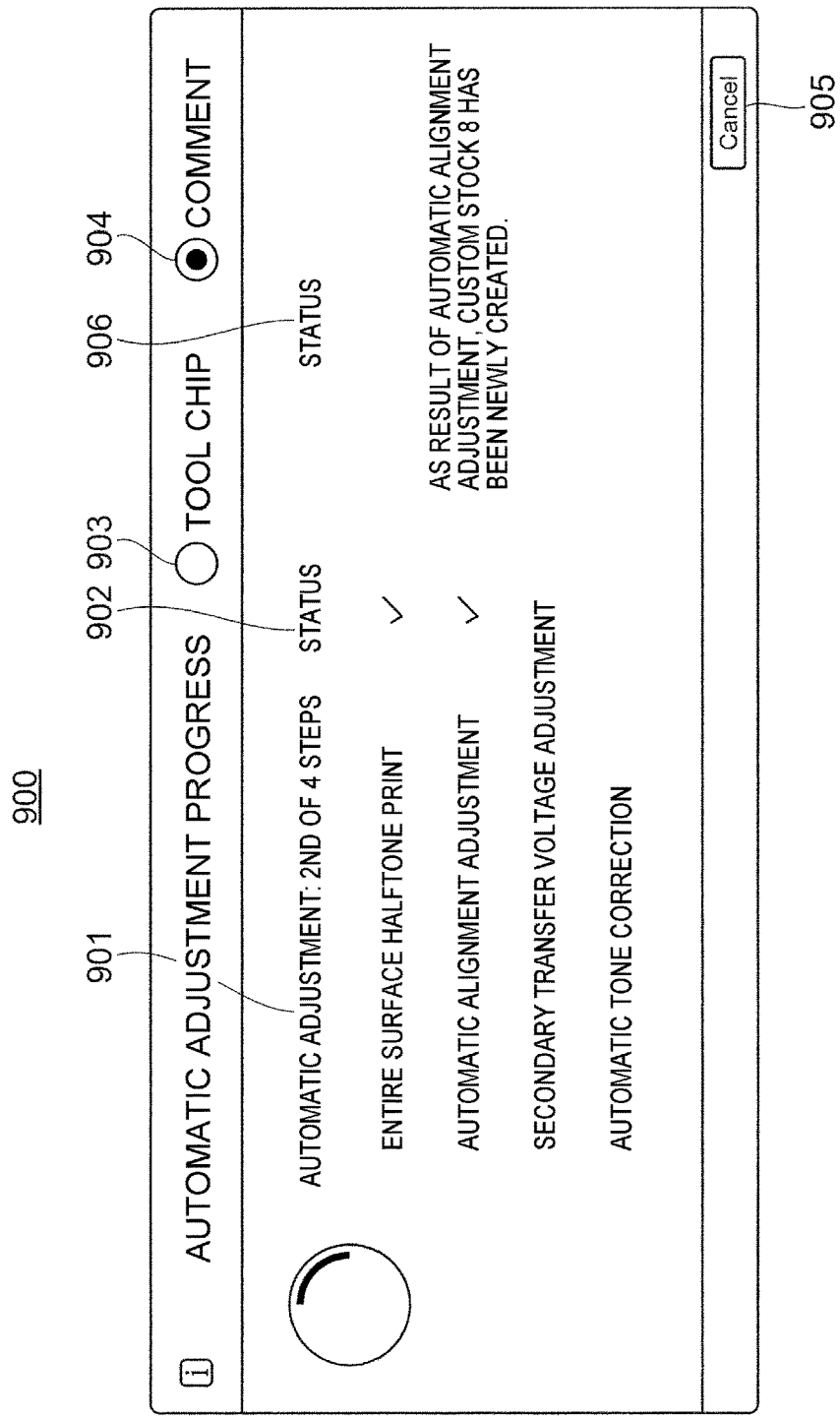
FIG. 12 is a view illustrating a display example when a new custom stock has been generated.

FIG. 12 is a view illustrating a display example when a new custom stock has been generated. In FIG. 12, the same reference numerals are given to the parts corresponding to those in FIG. 9. The example of FIG. 12 corresponds to a display screen when the selection button 904 for displaying information in the comment format has been selected.

In the example of FIG. 12, the comment field 906 displays that "as a result of automatic alignment adjustment, a custom stock 8 is newly generated."

In the example of FIG. 12, the display concerning the generation of the above described alignment (see FIG. 10) has disappeared. Alternatively, information indicating that the custom stock 8 has been generated may be displayed together with information indicating that the alignment has been generated.

Return back to the description for FIG. 6. Thereafter, the control device 300 reflects the created custom stock in the designated sheet feeding tray (step S114). As described above, reflecting the alignment result in the sheet feeding tray ensures that the subsequent adjustment operations make the adjustment with no positional deviation.

Subsequently, the control device 300 executes the secondary transfer voltage adjustment function (step S118). As described above, this adjustment operation is executed in a state where the adjustment result of the automatic alignment adjustment function has been reflected in the sheet feeding tray.

When reflecting the adjustment result of the secondary transfer voltage adjustment function in the custom stock (the custom stock 8) as the reflection destination of the adjustment result of the automatic alignment adjustment function (step S119), the control device 300 reflects the custom stock in the designated sheet feeding tray (step S120).

Here, in steps 118 and 119, the same determination process (steps S112 to S117) as that in the automatic alignment adjustment function is executed, and the adjustment result is reflected in the newly created custom stock 8.

At this point, both the adjustment result of the automatic alignment adjustment function and the adjustment result of the secondary transfer voltage adjustment function are applied to a specific sheet feeding tray.

In this exemplary embodiment, the control device 300 executes an adjustment operation concerning the automatic tone correction function on the sheet feeding tray in which the previously executed adjustment result has been reflected (step S121), and reflects the adjustment result in the image forming section 20 (step S122).

Here, the control device 300 newly creates and saves a print setting file (including the alignment and the stock) in which the adjustment results of the entire collective adjustment operation have been reflected.

When the execution of the in-plane non-uniformity adjustment function has been selected, the in-plane non-uniformity adjustment function is executed prior to the automatic tone correction function.

After the adjustment by the collective adjustment function ends, the following screen is displayed.

Figure 13:
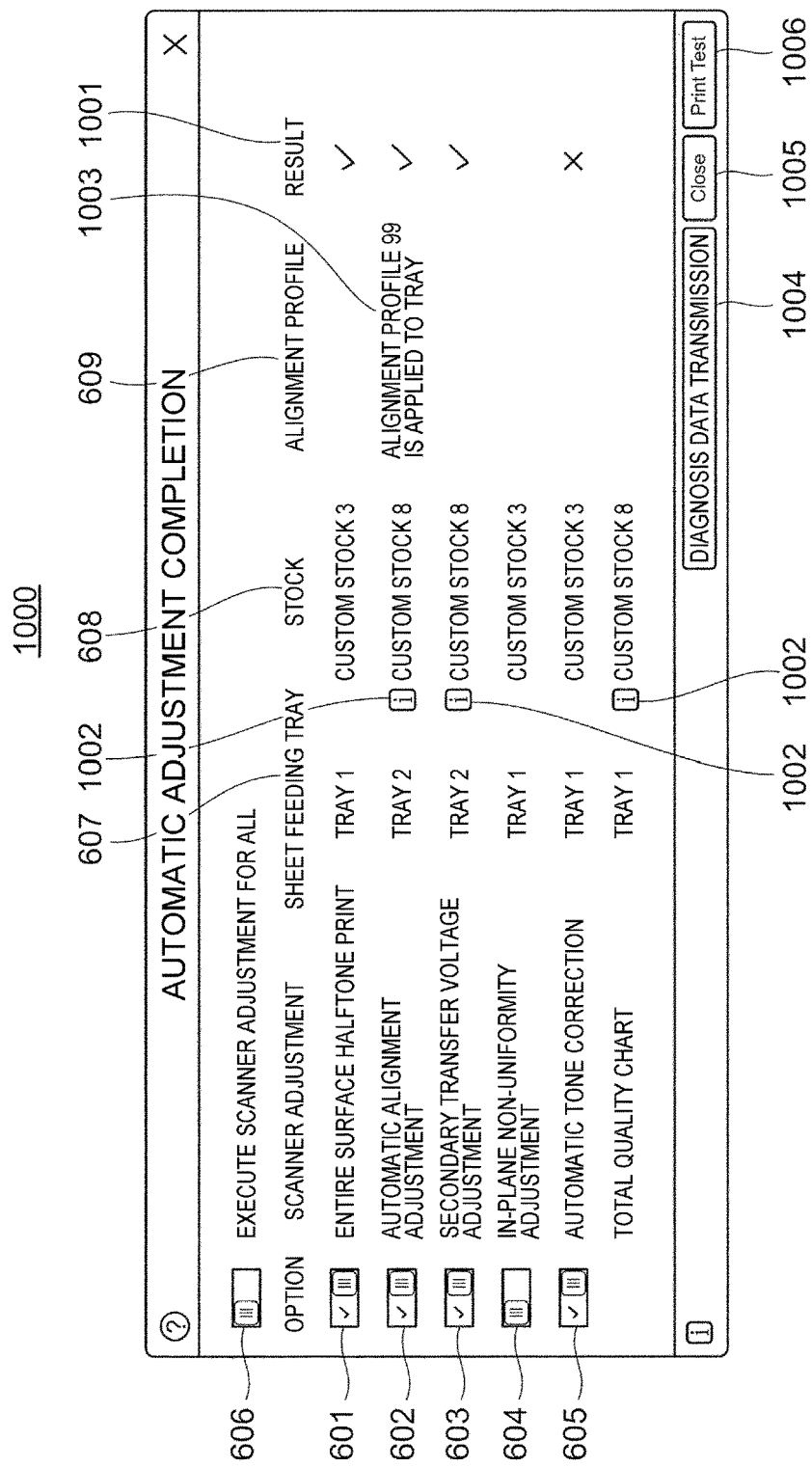
FIG. 13 is a view illustrating an example of a screen displayed after the completion of the collective adjustment function.

FIG. 13 is a view illustrating an example of a screen 1000 displayed after the collective adjustment function is completed. In FIG. 13, the same reference numerals as those in FIG. 5 described above are given.

In this exemplary embodiment, the screen 1000 includes a result display field 1001 that displays whether the adjustment operation concerning each adjustment item has been normally completed, a symbol 1002 indicating that the adjustment result has been saved in the custom stock generated during the execution of the adjustment operation, a description 1003 indicating an alignment applied to the automatic alignment adjustment, a diagnosis data transmission button 1004, a close button 1005, and a print test button 1006.

From the screen 1000 illustrated in FIG. 13, it is understood that the adjustment operations have been normally completed for three adjustment items among four selected adjustment items, but the adjustment operation for the automatic tone correction function has failed.

In the example of the screen 1000, it is understood that the adjustment result of the automatic alignment adjustment function and the adjustment result of the secondary transfer voltage adjustment function are saved in a newly created "custom stock 8."

As described above, when the collective adjustment function is executed, the subsequent adjustment operations are sequentially executed for a sheet feeding tray in which the adjustment result of each adjustment operation has been reflected. Thus, it is possible to obtain a collective adjustment result (a print setting file) in which no re-adjustment is needed or the necessity of re-adjustment is reduced at the stage of completion of the adjustment operations.

Therefore, the workload on the user such as manually re-adjusting the adjustment results and registering plural adjustment results in a stock may be reduced, and individual differences appearing in the adjustment results may also be reduced.

The adjustment operations concerning the collective adjustment function are executed in order from the adjustment item with the highest priority, among plural selected adjustment items. Thus, the accuracy of the adjustment result obtained by each adjustment operation is improved.

Even if the execution order of adjustment operations by the control device 300 depends on an order in which the adjustment items are selected on the initial screen 600, it is possible to designate adjustment items according to the recommended order by merely selecting the adjustment items in an order in which the adjustment items are arranged.

As described above with reference to FIG. 7, the control device 300 has a function capable of selecting whether or not to enable the function of displaying, without delay, information indicating that a new setting (e.g., an alignment or a custom stock) has been generated when the new setting is generated during the execution of the collective adjustment operation. Thus, the user may grasp the progress status concerning the reflection destination of the adjustment result without waiting for completion of the adjustment operations.

Thus, the user who has checked the generation of an unexpected alignment or custom stock may forcibly terminate the collective adjustment operation in progress and start over from the beginning.

As described above with reference to FIG. 8, the control device 300 may designate whether to reflect the adjustment result in a temporary stock or a custom stock, for the adjustment item for which the reflection destination is selectable. Thus, it is possible to obtain settings according to user's desire.

As described above with reference to FIGS. 10 to 12, the control device 300 has a function of accepting a selection of a format used for displaying the generation of a new setting. Thus, the user may easily understand the investigation result.

In the above described exemplary embodiment, the image forming apparatus 1 that forms an image by an electrophotographic system has been described. The invention may also be applied to an image forming apparatus that forms an image by an inkjet system.

In the above described exemplary embodiment, the image forming apparatus 1 that forms an image on a sheet cut into a predetermined size has been described. The invention may also be applied to an image forming apparatus that forms an image on a continuous strip-shaped sheet.

In the above described exemplary embodiment, descriptions have been made with respect to the case where the image forming apparatus 1 has a copy function, a scanner function, a facsimile transmission/reception function, and a print function. The image forming apparatus 1 does not need to have all of the functions and may be an apparatus specialized for anyone of the functions, for example, a copier, a scanner, a facsimile transmission/reception device, or a printer. The image forming apparatus 1 may be a so-called three-dimensional printer.

Second Exemplary Embodiment

In this exemplary embodiment, another apparatus having the collective adjustment function will be described.

In the above described first exemplary embodiment, descriptions have been made with respect to the case where adjustment operations concerning plural adjustment items related to the quality of an image to be printed are collectively executed. The need to collectively execute the adjustment operations concerning the plural adjustment items may be considered for various purposes. For example, such collective execution is also required for an adjustment of the quality of an image to be displayed, an adjustment of the quality of an image to be captured, and an adjustment of the quality of an article to be produced by processing.

Accordingly, in this exemplary embodiment, descriptions will be made with respect to an information processing apparatus having a function of collectively executing the adjustment operations concerning the plural adjustment items according to the purpose of use.

The information processing apparatus described in this exemplary embodiment may be connected to the image forming apparatus 1 described in the first exemplary embodiment and may be used as an apparatus that controls the execution of a collective adjustment in the image forming apparatus 1.

Figure 14:
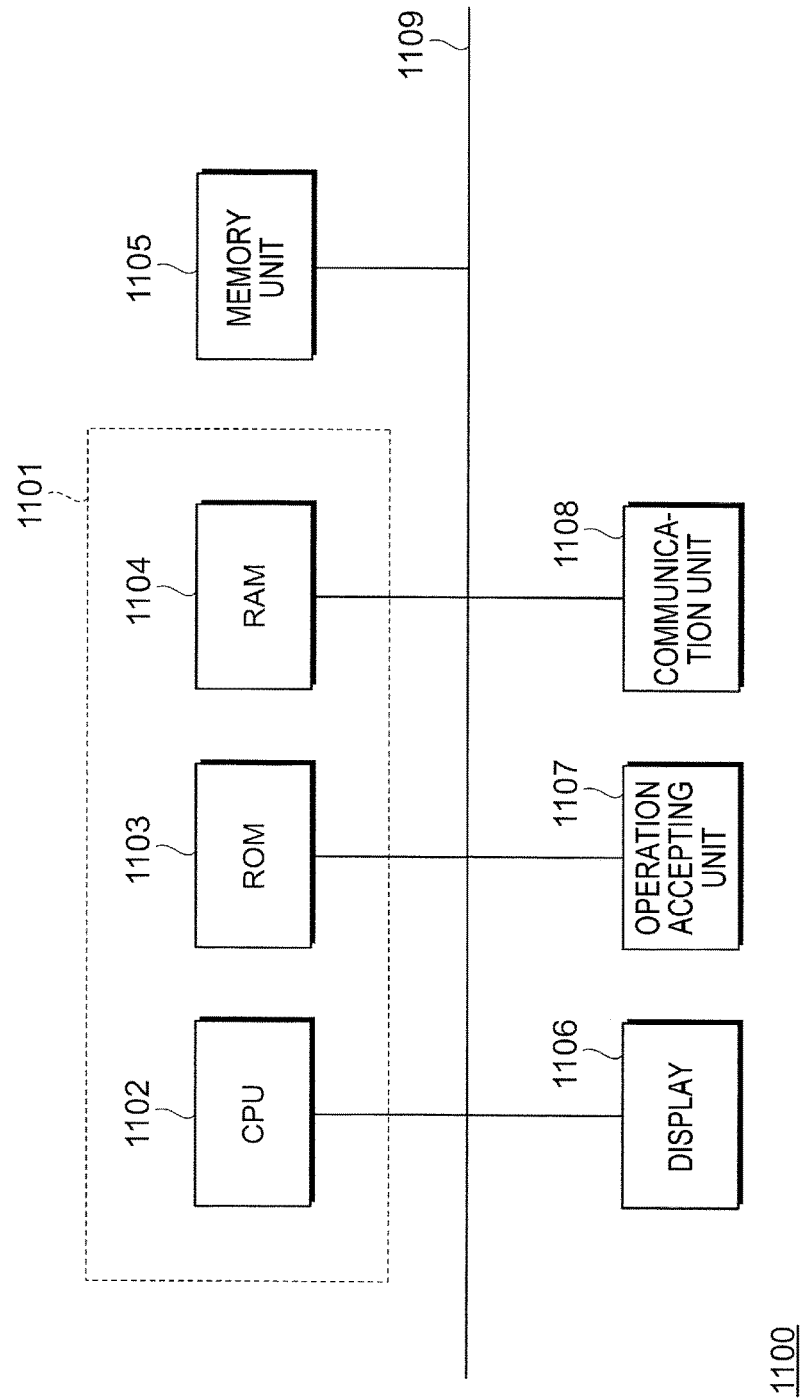
FIG. 14 is a view illustrating an example of a hardware configuration of an information processing apparatus according to a second exemplary embodiment.

FIG. 14 is a view illustrating an example of a hardware configuration of an information processing apparatus 1100 according to the second exemplary embodiment.

The information processing apparatus 1100 includes a controller 1101 that controls the entire apparatus, a memory unit 1105 that is used for storing image data, programs and the like, a display 1106 that is used for displaying an operation screen and the like, an operation accepting unit 1107 that accepts an input operation by a user, and a communication unit 1108 that is used for communicating with an external device.

These respective units are connected to each other via a bus 1109, and exchanges data through the bus 1109.

The controller 1101 is an example of a controller and is configured with a CPU 1102, a ROM 1103, and a RAM 1104.

A program executed by the CPU 1102 is stored in the ROM 1103. The CPU 1102 uses the RAM 1104 as a work area and executes the program read from the ROM 1103. Respective units of the information processing apparatus 1100 are controlled by executing the program.

The memory unit 1105 is configured with a memory device such as a hard disk device, a semiconductor memory and the like. The display 1106 is a display device that displays various images by executing a program (including an operation system or firmware). The display 1106 is configured with, for example, a liquid crystal display panel or an organic electro luminescence (EL) display panel. The operation accepting unit 1107 is an input device that accepts an operation by a user, and is configured with, for example, a keyboard, a button, a switch, a touch pad, a touch panel, and the like.

The communication unit 1108 is configured with, for example, a local area network (LAN) interface.

The controller 1101 in this exemplary embodiment functions as the collective adjustment function (FIG. 4) described in the first exemplary embodiment by executing the program, executes plural adjustment items accepted through the display of the initial screen according to the purpose in the recommended execution order, and executes adjustment operations of subsequent adjustment items based on the adjustment result of the respective adjustment items.

The controller 1101 in this exemplary embodiment may notify the user that a new setting has been generated during the adjustment operation prior to the completion of the adjustment operations.

As described above, the collective adjustment function described above in the first exemplary embodiment may also be applied to other purposes, and it is possible to grasp the reflection status of the adjustment result at an early stage before the adjustment operations are completed.

Other Exemplary Embodiments

Although the exemplary embodiments of the present invention have been described above, the technical scope of the present disclosure is not limited to the scope described in the above described exemplary embodiments. It is obvious from the description of the claims that various modifications or improvements for the above described exemplary embodiments are also included in the technical scope of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
   an image forming unit that forms an image on a recording material;
   an adjusting unit that sequentially executes adjustment operations corresponding to a plurality of adjustment items which are selected in advance; and
   a display that displays information indicating that a setting in which an adjustment result is to be reflected is newly generated when the setting is newly generated during execution of the adjustment operations.

2. The image forming apparatus according to claim 1, wherein the displaying of the information indicating that the setting is newly generated is executed if execution of the displaying is selected in advance.

3. The image forming apparatus according to claim 2, wherein a screen that accepts selection as to whether the displaying of the information indicating that the setting is newly generated is presented before the adjustment operations are initiated.

4. The image forming apparatus according to claim 1, wherein the display displays a screen that accepts a type of the setting in which the adjustment result is reflected.

5. The image forming apparatus according to claim 4, wherein the type of the setting is accepted individually for at least a part of the plurality of adjustment items.

6. The image forming apparatus according to claim 1, wherein a storage period of the newly generated setting is undefined.

7. The image forming apparatus according to claim 1, wherein a screen that accepts a method for displaying the information indicating that the setting has been newly generated is displayed.

8. An information processing apparatus comprising:
   an adjusting unit that sequentially executes adjustment operations corresponding to a plurality of adjustment items which are selected in advance; and
   a display that displays information indicating that a setting as a reflection destination of an adjustment result is newly generated when the setting is newly generated during execution of the adjustment operations.

9. A non-transitory computer readable medium storing a program causing a computer to execute information processing comprising:
   sequentially executing adjustment operations corresponding to a plurality of adjustment items which are selected in advance; and
   displaying information indicating that a setting as a reflection destination of an adjustment result is newly generated when the setting is newly generated during execution of the adjustment operations.

* * * * *